US010754351B2

(12) United States Patent
Martinson et al.

(10) Patent No.: US 10,754,351 B2
(45) Date of Patent: Aug. 25, 2020

(54) OBSERVABILITY GRID-BASED AUTONOMOUS ENVIRONMENT SEARCH

(71) Applicant: TOYOTA JIDOSHA KABUSHIKI KAISHA, Toyota-shi, Aichi-ken (JP)

(72) Inventors: Eric Martinson, Sunnyvale, CA (US); Jose Capriles Grane, Mountain View, CA (US); Yusuke Nakano, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/445,630

(22) Filed: Feb. 28, 2017

(65) Prior Publication Data
US 2018/0246520 A1    Aug. 30, 2018

(51) Int. Cl.
G05D 1/02    (2020.01)
G05D 1/00    (2006.01)

(52) U.S. Cl.
CPC ......... G05D 1/0274 (2013.01); G05D 1/0094 (2013.01); G05D 2201/0207 (2013.01)

(58) Field of Classification Search
CPC .................................................. G05D 1/0246
See application file for complete search history.

(56) References Cited

U.S. PATENT DOCUMENTS

| 8,379,920 | B2 | 2/2013 | Yang et al. |
| 8,427,472 | B2 | 4/2013 | Moravec |
| 8,855,911 | B2 | 10/2014 | Ma et al. |
| 9,301,722 | B1 | 4/2016 | Martinson |
| 2004/0073368 | A1* | 4/2004 | Gonzalez-Banos ...... G05D 1/12 701/301 |
| 2008/0123900 | A1 | 5/2008 | Ma et al. |
| 2009/0119010 | A1* | 5/2009 | Moravec ............. G05D 1/0251 701/533 |

(Continued)

FOREIGN PATENT DOCUMENTS

| JP | 2007-41657 | 2/2007 |
| JP | 2007-156577 | 6/2007 |

(Continued)

OTHER PUBLICATIONS

Martinson et al., "Noise Maps for Acoustically Sensitive Navigation," Optics East, International Society for Optics and Photonics, Dec. 2004 (11 pages).

(Continued)

*Primary Examiner* — Imran K Mustafa
(74) *Attorney, Agent, or Firm* — Patent Law Works LLP

(57) ABSTRACT

The novel technology described in this disclosure includes an example method comprising initializing an observability grid with an observation likelihood distribution for an environment being navigated by a mobile detection system, such as but not limited to a robot; searching the environment using the observability grid for an observation point; navigating, using a propulsion system, the robot to the observation point; and observing a target object from the observation point. The observability grid may include two or more spatial dimensions and an angular dimension. In some cases, the method may include sampling the environment with the robot based on the observation likelihood distribution of the observability grid.

29 Claims, 9 Drawing Sheets

(56) References Cited

U.S. PATENT DOCUMENTS

| | | | |
|---|---|---|---|
| 2010/0085358 A1 | 4/2010 | Wegbreit et al. | |
| 2012/0150441 A1* | 6/2012 | Ma | G01S 5/0252 701/510 |
| 2012/0185094 A1 | 7/2012 | Rosenstein et al. | |

FOREIGN PATENT DOCUMENTS

| | | |
|---|---|---|
| JP | 2011-128911 | 6/2011 |
| JP | 2012-78950 | 4/2012 |
| JP | 2014119901 A | 6/2014 |
| JP | 2015-219802 | 12/2015 |

OTHER PUBLICATIONS

Martinson et al., "Auditory Evidence Grids," Intelligent Robots and Systems, Oct. 2006 IEEE International Conference (6 pages).

Basilico et al., "Defining Effective Exploration Strategies for Search and Rescue Applications with Multi-Criteria Decision Making," 2011 IEEE International Conference on Robotics and Automation, Shanghai International Conference Center, May 9, 2011 (6 pages).

Chumtong et al., "Vision-based Object Search in Unknown Human Environment using Object Co-occurrence Graph," Proceedings of the 2011 IEEE International Conference on Robotics and Biomimetics, Dec. 7, 2011, Phuket, Thailand (6 pages).

Samadi et al., "Using the Web to Interactively Learn to Find Objects," In Proceedings of AAAI, the Twenty-Sixth Conference on Artificial Intelligence, Toronto, Canada Jul. 2012 (7 pages).

Kulich et al., "Single Robot Search for a Stationary Object in an Unknown Environment," 2014 IEEE International conference on Robotics & Automation, Hong Kong Convention and Exhibition Center, May 31, 2014 (6 pages).

Eisenbach et al., "User recognition for guiding and following people with a mobile robot in a clinical environment," 2015 IEEE/RSJ Int. Conf. on Intelligent Robots and Systems (IROS), Sep. 28-Oct. 2, 2015, Hamburg, DE, pp. 3600-3607.

Martinson et al., "Identifying People with Soft-Biometrics at Fleet Week," Proceedings of the 8th ACM/IEEE International conference on Human-robot interaction, Mar. 2013, IEEE Press, pp. 49-56.

Satake et al., "Visual Person Identification Using a Distance-dependent Appearance Model for a Person Following Robot," International Journal of Automation and Computing, vol. 10, No. 5, Oct. 2013, pp. 438-446.

Yang et al., "Enforcing Template Representability and Temporal Consistency for Adaptive Sparse Tracking," IJCAI'16 Proceedings of the Twenty-Fifth International Joint Conference on Artificial Intelligence, Jul. 9-15, 2016, New York, NY, US, pp. 3522-3529.

* cited by examiner

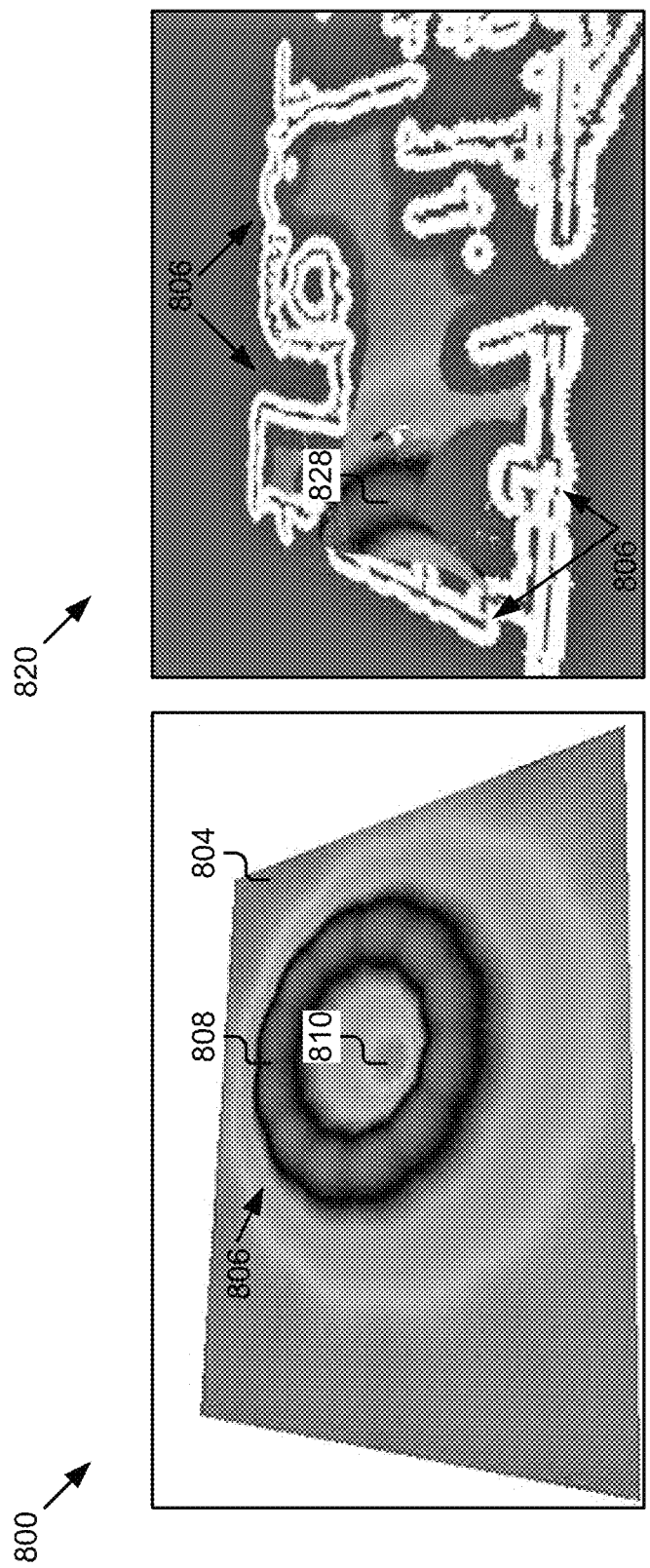

OBSERVABILITY GRID-BASED AUTONOMOUS ENVIRONMENT SEARCH

BACKGROUND

The present disclosure relates to autonomous computing and mobility.

Today, many autonomous computer systems rely on detection and recognition techniques for various different applications. However, for a mobile robot, the task of finding an object or person in an environment can be a challenging one. Some older solutions rely heavily on an accurate perceptual classification algorithm that guarantees an object will be found if the robot can point a sensor (e.g. a camera) at the target. Unfortunately, such classification reliability is often highly unlikely in everyday use. Even people make mistakes when recognizing objects. Given significant environmental occlusions, lighting conditions, or simply viewing the object from a difficult angle, the robot often fails to find the target and continues to aimlessly search the environment.

Searching an environment for an object (person, inanimate object, etc.) has been a task of great interest to mobile robotics for a long time, and is one that generally continues to lack an effective solution for an arbitrary environment. There have been a number of methods proposed over the years in various different domains that have attempted to solve this problem.

Search and rescue is a domain of significant interest when discussing searching for objects. Within this domain, planning-based approaches have been commonly proposed and evaluated for searching an unknown environment, making use of classic algorithmic solutions such as frontier-based search and the travelling salesman problem. One such approach is described in the work: Miroslav Kulich et al., "*Single robot search for a stationary object in an unknown environment*," Robotics and Automation (ICRA), 2014 IEEE International Conference on Robotics and Automation (2014).

Another work: Nicola Basilico et al., "*Defining effective exploration strategies for search and rescue applications with Multi-Criteria Decision Making*," Robotics and Automation (ICRA), 2011 IEEE International Conference on Robotics and Automation (2011), follows a related vein of work in which search is treated as a decision problem in which the navigational solutions seek to maximize a number of different search goals with varying levels of importance every time the robot is moved.

The solutions proposed by the above works, however, are designed to search an unknown environment with no prior knowledge of where the object is located—building a map of the environment while searching for people and objects. Neither of these works directly address the varying ability of the robot to observe an object in their navigational choices.

An alternative method that does address bad sensor positioning in the auditory domain is described in the work: Eric Martinson et al., "*Noise Maps For Acoustically Sensitive Navigation*," Mobile Robots XVII (2004). This work proposed an approach that samples the environment repeatedly to build the map first, and then follow a gradient to detected sound sources by maximizing the signal to noise ratio in the map. Alternatively, moving away from known sound sources minimized environmental interference when listening for new auditory events. The approach, however, is limited in its application to search because it requires a lengthy sample of the environment first, and does not apply to arbitrary sensing domains where angle of observation is important.

Evidence or occupancy grids have been used by some solutions in robot guidance. This approach combines evidence together in a spatial representation or map, and uses it to guide a robot. The work: Eric Martinson et al., "*Auditory Evidence Grids*," 2006 IEEE/RSJ International Conference on Intelligent Robots and Systems (2006), extended this approach in the auditory domain, incorporating directional sound measurements in an evidence grid representation to indicate probabilistically where noisy objects were most likely located based on the sum of the observations collected by the robot.

Some solutions describe guiding robots using evidence grids, such as U.S. patents: U.S. Pat. No. 8,427,472 to Moravec (Moravec) and U.S. Pat. No. 8,855,911 to Ma et al. Moravec, in particular, identifies a method in which a mobile robot can search for an object in the environment based on the evidence grid. However, there is a significant problem with using underlying evidence grid representation for search. It was designed originally for mapping obstacles in the environment and represents how likely any particular discretized location in the environment is to contain an object (e.g. an obstacle). The evidence grid does not indicate how a robot should position itself to actually detect or recognize the object. Instead, the assumption is that if the sensor is pointed at the object, then the object will be detected with some known likelihood of detection. In practice, however, robots are often unable to accurately estimate the likelihood of detection without knowing both the position and orientation of the object the robot is searching for, which is impracticable for most search applications (e.g., why would the robot be searching for the object if it already knows where it is?). To get around these difficulties with evidence grids, robot engineers attempt to resort to heuristics for navigation controllers, such as introducing random noise and forcing the robot to search the area multiple times. Such ad hoc solutions for overcoming limitations associated with using evidence grids to searching an area often leads to undesirable motion and failure to find the target object in cluttered spaces.

In contrast to the uninformed search that often defines search and rescue, a person can often pitch in to help the robot in some types of environments. This can be passive or active assistance to help a robot set search priorities. Passive assistance may, for example, use images tagged and uploaded to the Internet by people to build association graphs between different objects and/or visual features. If the robot can find a related object, it might lead to the actual target of the search. This method, of course, assumes that the environment being searched is similar to the pictures used to build the co-occurrence graph, an assumption that often proves false for a particular environment. See Puwanan Chumtong et al., "*Vision-based object search in unknown human environment using object co-occurrence Graph*," Robotics and Biomimetics (ROBIO), 2011 IEEE International Conference on Robotics and Biomimetics (2011).

Some solutions use a combination of active and passive information to inform the search algorithm, such as that proposed by Mehdi Samadi et al., "*Using the Web to interactively learn to find objects*" AAAI'12 Proceedings of the Twenty-Sixth AAAI Conference on Artificial Intelligence (2012), which uses returns from a search engine query to identify relative semantic associations. An example includes a "printer room" being more likely than "kitchen" when searching for paper. As with the above solution, this method, of course, assumes that the environment being searched is similar to query results, an assumption that also often proves false for a particular environment. This solution also proposes asking people directly to help with finding the object within the room, rather than continuing to search autonomously after reaching the correct vicinity, which can result in an overreliance on active information.

SUMMARY

This document discloses innovative technology for addressing the problems in the Background. The technology can determine locations from which the robot can find objects of interest rather than just searching for the most likely object positions, which can, among other things, allow a robot to overcome a variety of positional difficulties with its underlying detection and recognition algorithms and/or incorporate a variety of other feedback including historical information and human suggestions.

According to one innovative aspect of the subject matter described in this disclosure, a computer-implemented method for observing a target object with a robot using an observability grid, the method comprises: initializing, using one or more processors, an observability grid with an observation likelihood distribution for an environment being navigated by a robot; searching, using the one or more processors, the environment using the observability grid for observation points; navigating, using a propulsion system, the robot along a path including two or more observation points having higher observation likelihood values than other observation points in the observability grid; observing, using one or more sensors of the robot, a target object from a first observation point along the path; updating, using the one or more processors, the observability grid based on observing the target object from the first observation point; navigating, using a propulsion system, the robot along the path to a second observation point; observing, using one or more sensors of the robot, the target object from the second first observation point; and updating, using the one or more processors, the observability grid based on observing the target object from the second observation point.

In general, another innovative aspect of the subject matter described in this disclosure may be embodied in computer-implemented methods comprising: initializing, using one or more processors, an observability grid with an observation likelihood distribution for an environment being navigated by a mobile detection system; searching, using the one or more processors, the environment using the observability grid for an observation point; navigating, using a propulsion system, the mobile detection system to the observation point; and observing, using one or more sensors of the mobile detection system, a target object from the observation point.

In general, another innovative aspect of the subject matter described in this disclosure may be embodied in systems comprising: a mobile detection system coupled to one or more sensors adapted to observe an environment, the mobile detection system including a propulsion system that moves the mobile detection system around the environment, the mobile detection system including one or more computer processors programmed to perform operations comprising: initializing an observability grid with an observation likelihood distribution for the environment being navigated by the mobile detection system; searching the environment using the observability grid for an observation point; navigating, using the propulsion system, the mobile detection system to the observation point; and observing, using one or more sensors of the mobile detection system, a target object from the observation point.

These and other implementations may each optionally include one or more of the following features: that the observability grid includes two or more spatial dimensions and an angular dimension; determining, using the one or more processors, to adjust a local observability based on a type of the target object and a perceptual recognition performed by the mobile detection system; that initializing the observability grid further includes: sampling, using the one or more processors, the environment with the mobile detection system based on the observation likelihood distribution of the observability grid that initializing the observability grid further includes retrieving, using the one or more processors, an obstacle map, identifying, using the obstacle map, grid cells in the observability grid that correspond to locations that are obstructed, and reducing, using the one or more processors, the observation likelihood values for the corresponding grid cells in the observability grid; that the locations that are obstructed are unreachable by the mobile detection system; that the observation likelihood distribution includes one of a uniform distribution, a random initial distribution, and a predefined initial distribution; that initializing the observability grid includes processing contextual data reflecting one or more historical positions of the target object within the environment, and increasing observation likelihood values of grid cells in the observability grid corresponding to the historical positions; that initializing the observability grid includes: processing contextual data reflecting one or more of a historical position, co-occurrence of animate or inanimate objects, a time, a date, a light condition, and a weather condition; responsive to observing the target object from the observation point, updating, using the one or more processors, the observability grid to reflect a result of the observation; that the observability grid is updated positively or negatively based on the result; determining the observation point and a path to the observation point based on an observation likelihood value associated with the observation point and one or more of a traversal speed, a distance to the observation point, and an angle of observation associated with the observation point, that navigating the mobile detection system to the observation point is performed using the path; that observing the target object from the observation point includes one of performing a single observation at the observation point, performing an observation at one or more of a location before the observation point, at the observation point, and a location past the observation point, and observing the environment for a change in one or more of a camera pose and an observed scene; that determining the existence of the object in the observation point further includes executing, using the one or more sensors, an observation by the mobile detection system, determining, using the one or more processors, that the observation has detected the object, and updating, using the one or more processors, the observability grid based on the observation detecting the object.

Other implementations of one or more of these and other aspects include corresponding systems, apparatus, and computer programs, configured to perform the actions of methods, encoded on non-transitory computer storage devices.

The technology described herein is particularly advantageous in a number of respects. For instance, the technology herein can overcome a variety of positional difficulties with its underlying detection and recognition algorithms, including angle-specific sensing limitations; incorporate the effects of obstacles on selection of viewing positions; improve navigation in arbitrary (e.g., unknown or dynamic environments); incorporate a variety of other feedback including historical information and human suggestions; determine observation position likelihoods using contextual knowledge to speed search; encourage repeated sampling from different angles in highly likely regions; and incorporate human input. It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

FIG. 8A is a graph showing an adjusted local observability without obstacles.

FIG. 8B is a graph showing an adjusted local observability with obstacles.

DESCRIPTION

This document discloses innovative technology for determining observation locations from which a detection system can observe target objects. The technology uses an observability grid to determine where to move the detection system. The observability grid describes where to move the detection system, which algorithmically enables the detection system to overcome angle specific limitations to detecting objects with one or more sensors (e.g. faces cannot be directly detected from behind a person); incorporate the effects of obstacles on selection of viewing positions; using previous detections to speed up searching for positioning locations; incorporate repeated sampling from different angles in highly likely grid regions, etc.

Figures 1A, 1B:
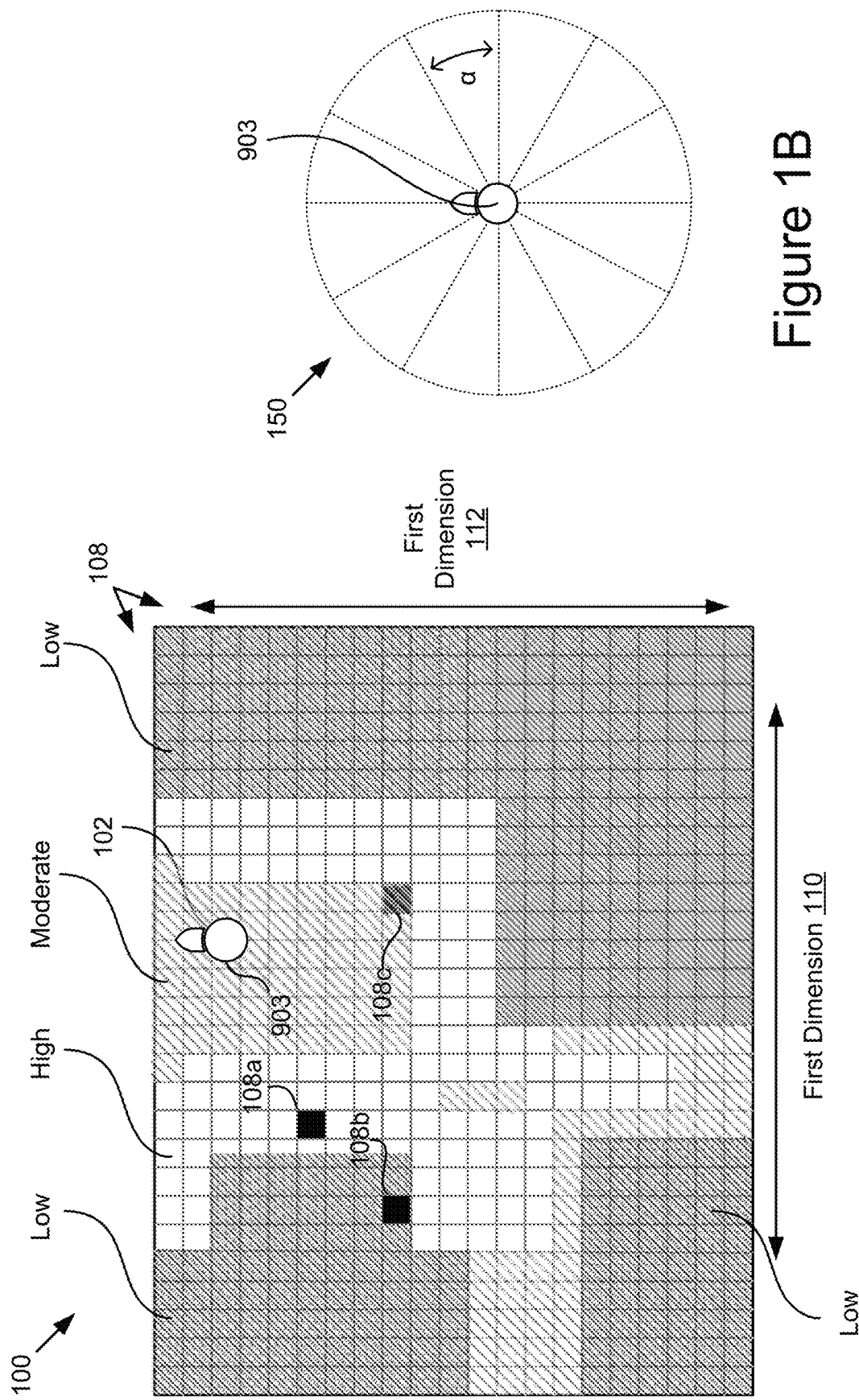
FIG. 1A is diagram of an example observability grid having multiple spatial dimensions and with various grid sections called out.
FIG. 1B is a diagram of an example angular dimension of an observability grid.

An observability grid includes two or more spatial dimensions. FIG. 1A is diagram of an example observability grid 100 having at least a first dimension 110 (e.g., x axis) and the second dimension 112 (e.g., y axis), although it should be understood that the observability grid may include one or more further dimensions, such as an angular dimension as discussed below, a z-axis reflecting a third spatial dimension, etc. The observability grid 100 is divided into grid cells 108. The periodicity of the grid cells 108 in the first dimension 110 and the second dimension 112, and/or any other dimensions (e.g., a third dimension, an angular dimension, etc.) may be independently or cooperatively uniform, random, have a regular predefined pattern, etc.

One or more grid cells 108 of the observability grid 100 may include an angular dimension defining an angle of observation from the spatial location represented by the grid cell 108. For instance, a detection system 903 (e.g. see also FIG. 9), such as a wheeled indoor robot, may be searching for people within a room using a sensing system comprising one or more sensors 955 (e.g., see FIG. 9) may have an effective field of view of 30°, and which case the observability grid may include an angular dimension defining a grid cell for every 30° (e.g., with 12 cells for full 360° visibility) (other variations are also possible and contemplated). FIG. 1B is a diagram of an example angular dimension 150 of the observability grid 100. In the depicted example, the angular dimension 150 is divided into uniform cells having an angle α. The value of the angle α may be determined by the technology or predetermined. In some instances, the value may be set based on an initial distribution, and observation angle learned during sampling and/or observation, etc., as discussed elsewhere herein.

The distribution of grid cell values across the observability grid 100 may initially be uniform, random, or otherwise predefined. In the example depicted in FIG. 1A, select grid cells 108a, 108b, and 108c are emphasized by way of illustration and not limitation. These select grid cells 108a, 108b, and 108c each have been assigned different grid cell values as reflected by the different shading included in FIG. 1A. For example, grid cell 108a is situated in a grid cell region having relatively high grid cell values relative to other regions of the observability grid 100. In this example, the relatively high grid cell values reflect high likelihoods of suitable observation positions for a detection system 903 then other regions of the observability grid 100, and thus the environment reflected by the observability grid 100. For instance, from a position corresponding to grid cell 108a, the detection system 903 may have unobstructed line of sight of a target object at an optimal sensing distance at various viewing angles.

The grid cell 108b situated in the grid cell region has relatively low grid cell values relative to other regions of the observability grid 100. In this example, the relatively low grid cell values reflect low likelihoods of suitable observation positions for the detection system 903. For instance, from a position corresponding to grid cell 108b, the detection system 903 may have unobstructed line of sight of a target object but at less-than-optimal but adequate sensing distance at various viewing angles.

The grid cell 108b situated in the grid cell region has relatively moderate grid cell values relative to grid cells in other regions of the observability grid 100, such as those regions having higher or lower grid cell values. In this example, the relatively moderate grid cell values reflect moderate likelihoods of suitable observation positions for the detection system 903. For instance, from a position corresponding to grid cell 108c, the detection system 903 may have a partially or fully obstructed line of sight of a target object for various viewing angles.

Advantageously, using an observability grid 100 to determine where to position the sensor(s) 955, the detection system 903 can search for object(s) more effectively without having to rely fully on ad-hoc heuristic navigation that rely on where objects are located and often lead to undesirable side-effects, such as those described in the Background. This further can allow the detection system 903 to overcome angle-specific limitations to detecting objects with sensor(s) 955 (e.g. faces cannot be detected from behind a person), incorporate effects of obstacles on selection of viewing positions, use previous detections to speed up search, and facilitate repeated sampling from different angles in highly likely regions.

Figure 2:
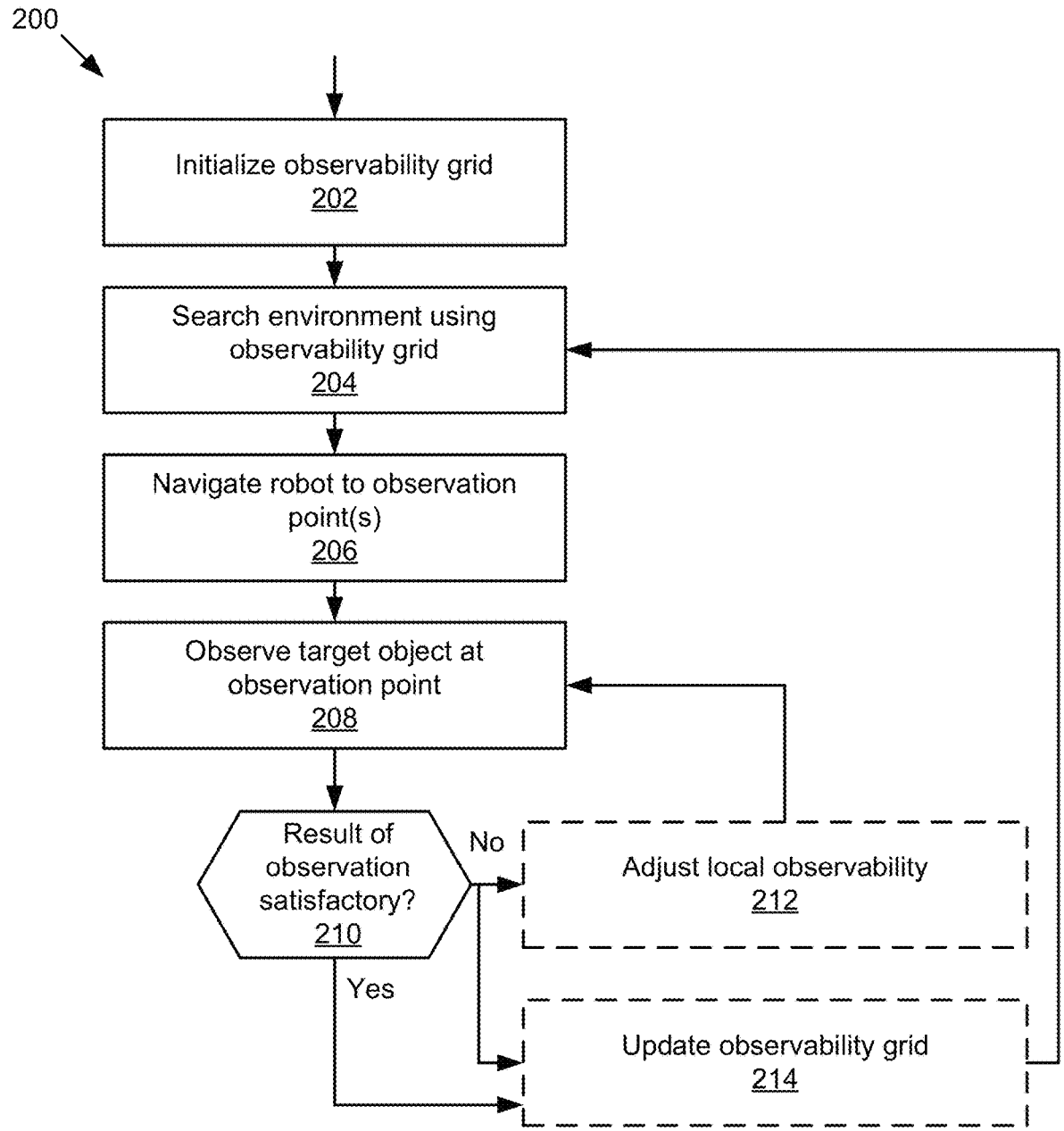
FIG. 2 is a flowchart of an example method for observing target object(s) in an environment using an observability grid.

FIG. 2 is a flowchart of an example method 200 for observing target object(s) in an environment using an observability grid. The description of FIG. 2 includes reference to various reference components depicted in FIGS. 9 and 10, which are described in further detail below, such as the example system 900, which includes a detection system 903 having a propulsion system 957 and a detection management application 935. In various embodiments, the detection management application 935 may include various components having various forms, such as the grid initializer 1002, an object detector 1004, a grid updater 1008, and a navigator 1010.

Under the method 200, in block 202, the grid initializer 1002 initializes an observability grid with an observation likelihood distribution for an environment being navigated by a mobile, semi or fully autonomous detection system 903.

In some embodiments, the grid may be initialized using existing values determined during prior iterations of the method 200. In some embodiments, the observation likelihood distribution may have a variety of different forms including, but not limited to, a uniform distribution, a random initial distribution, and a predefined initial distribution. The uniform distribution may include constant values for some or all of the grid cells comprising the observability grid. A uniform initial distribution may instruct a detection system 903 to sample observation locations in an environment densely, starting with the detection system 903's initial location or a predetermined starting location. A random initial distribution may instruct a detection system 903 sample the environment randomly, selecting arbitrary initial locations from which to make observations. A predefined initial distribution may instruct a detection system 903 to seek a particular search pattern including particular locations from which to make observations. As observations are made, the detection system 903 may update the observability grid with refined likelihood values based on observations made from various locations within the environment and/or interaction with objects included within the environment by the detection system 903.

In some embodiments, if an environment is fully or partially known, the system 900 may store optical map data reflecting an obstacle map that maps obstacles that could block mobility of a detection system 903 and/or the sensing capabilities of the detection system 903. For example the detection management application 935 may store the optical map data in the grid database 999, and may retrieve the obstacle map data and process it to identify locations corresponding to particular grid cells in the observability grid that would present an obstacle to a detection system 903 that is navigating and observing the environment. In particular, the grid initializer 1002 of the detection management application 935 may assign likelihood values that, when compared to other likelihood values of the grid, reflect lower observability likelihoods for the grid cells that correspond to the obstacle locations within the environment. The detection system 903 may process these poor likelihood values and determine a path that avoids these obstructed locations so the detection system 903 does not expend resources attempting to reach those locations, but rather navigates to unobstructed locations corresponding to grid cell having values higher than the poor likelihood values, which reflect that the detection system 903 may successfully perform observations with higher probability.

In some embodiments, an observability grid may be initialized with contextual data. Contextual data may reflect the positions and/or angles from which objects have been detected in the past. The grid initializer 1002 may retrieve contextual data and use it to assign likelihood values to the different grid cells of the grid. This allows desirable positions, from which to observe target object(s), to have relatively higher initial values so the detection system 903 may begin observations from those positions before investigating other locations from which to observe the target object(s). This can advantageously speed up search and observation in many cases.

One non-limiting example of adding contextual knowledge to the grid is as follows. For each sensor (e.g., camera) position $c=\{x_c, y_c, \theta_c\}$ from which a person was observed, the likelihood (L) of observing the person at a grid cell with centroid $(g=\{x_g, y_g, \theta_g\})$ in the observability grid is determined using a pre-specified covariance ($\Sigma_{db}$) with the normal distribution equation:

$$P_{ctxt}(\vec{c}, \vec{g}) = e^{-(\vec{c}-\vec{g})\Sigma_{db}^{-1}(\vec{c}-\vec{g})^T} \qquad \text{Equation 1}$$

$$L_{ctxt}(\vec{c}, \vec{g}) = \begin{Bmatrix} P_{ctxt}(\vec{c}, \vec{g}) & \text{if } P_{ctxt}(\vec{c}, \vec{g}) > 0.5 \\ 0.5 & \text{else} \end{Bmatrix} \qquad \text{Equation 2}$$

Given a set of sensor positions, C, from which the target object (e.g., person) was successfully detected, a single grid cell in the observability grid may be updated using log likelihoods:

$$O(C, \vec{g}) = \sum_i \log\left(\frac{L_{ctxt}(\vec{c}_i, \vec{g})}{1 - L_{ctxt}(\vec{c}_i, \vec{g},)}\right) \forall \vec{c}_i \in C \qquad \text{Equation 3}$$

Note that the set of sensor positions, C, added to the grid does not need to include the entire set of prior observations. Although not required, in some cases, a representative subset may be selected and added to the observability grid to guide search. Also, after desired positions have been added to the grid, the grid initializer 1002 can rescale the grid to an arbitrary range (e.g., [0,X]). Small random noise can also be added at this point to avoid deadlock and/or local minima as the robot chooses points in the environment to investigate.

Additional or alternative contextual data that could be added includes, but is not limited to:

Co-occurrence of people or objects—if a detection system 903 is requested to search for two objects, where A represents the set of positions from which one object was detected, and B represents the set of positions from the second object, then the grid initializer 1002 can initialize the observability grid with the union of A and B (∪). Should the detection system 903 be requested to find both objects together (e.g. hand over the object to Bill and Mary together), then the grid initializer 1002 may generate the set of A intersects B (A∩B) to initialize the grid.

Time and/or date dependent initialization—the grid initializer 1002 may initialize the grid according to the time and/or day of interest. People, for instance, may be found in different locations at different times of day, so a grid to search for a specific person can be initialized to reflect that.

Lighting condition dependence—similar to time and date, lighting conditions can change throughout the day, affecting the quality of visual classification systems. Picking from previous detections (e.g., that occurred during time ranges with similar lighting conditions (e.g. around noon, nighttime) or with similar weather conditions (e.g. cloudy, stormy, sunny)) can help an autonomous detection system 903 find the best location for visual classification of an object.

With respect to the above example involving objects A and B, FIGS. 4-6B are diagrams of example observability grids 600, 620, 640, 660 associated with a given environment that may be generated based on contextual data. The environment may include various furnishings, such as a couch 106, a coffee table 104, a desk 110, a bed 112, and/or a dresser 114. The areas within the observability grids 600, 620, 640, and 660, that are shaded with shading 601 represents grid cells having relatively lower likelihood values due for viewing angles and/or the probability of the detection system 903 running into and/or being obstructed by the furnishings. The areas within the observability grids 600, 620, 640, and 660 that are shaded with shading 603 represent grid cells having likelihood values that are higher than grid cells associated with the shading 601, but lower than other regions in the observability grid. The detection system 903 may perform observations from the grid cells in these areas but contextual data has shown that the results of such observations are qualitatively not as good as those from regions associated with grid cells having values of higher likelihood. The areas within the observability grids 600, 620, 640, 660 that are shaded with shading 602 have likelihood values that are higher than the grid cells and regions associated with shading 603 and 601, but lower than grid cells in the regions shaded with shading 604.

The observability grid 600 reflects a set of positions associated with object A described B. The observability grid 620 associated FIG. 6B reflects a set of positions associated with object B described above. The observability grid 640 reflects a union of the observability grids 600 and 620, and the observability grid 660 reflects an intersect of the observability grids 600 and 620. The result of the union and/or intersect operations yields grids with refined likelihood grid cell values, that when used by the navigator 1010 to determine the path environment from which to observe both objects A and B, may produce observations capturing both objects from an angle and position that provides valuable and reliable and accurate recognition of the target objects, interaction with the target objects and/or detection of actions performed by the target objects.

Figure 3:
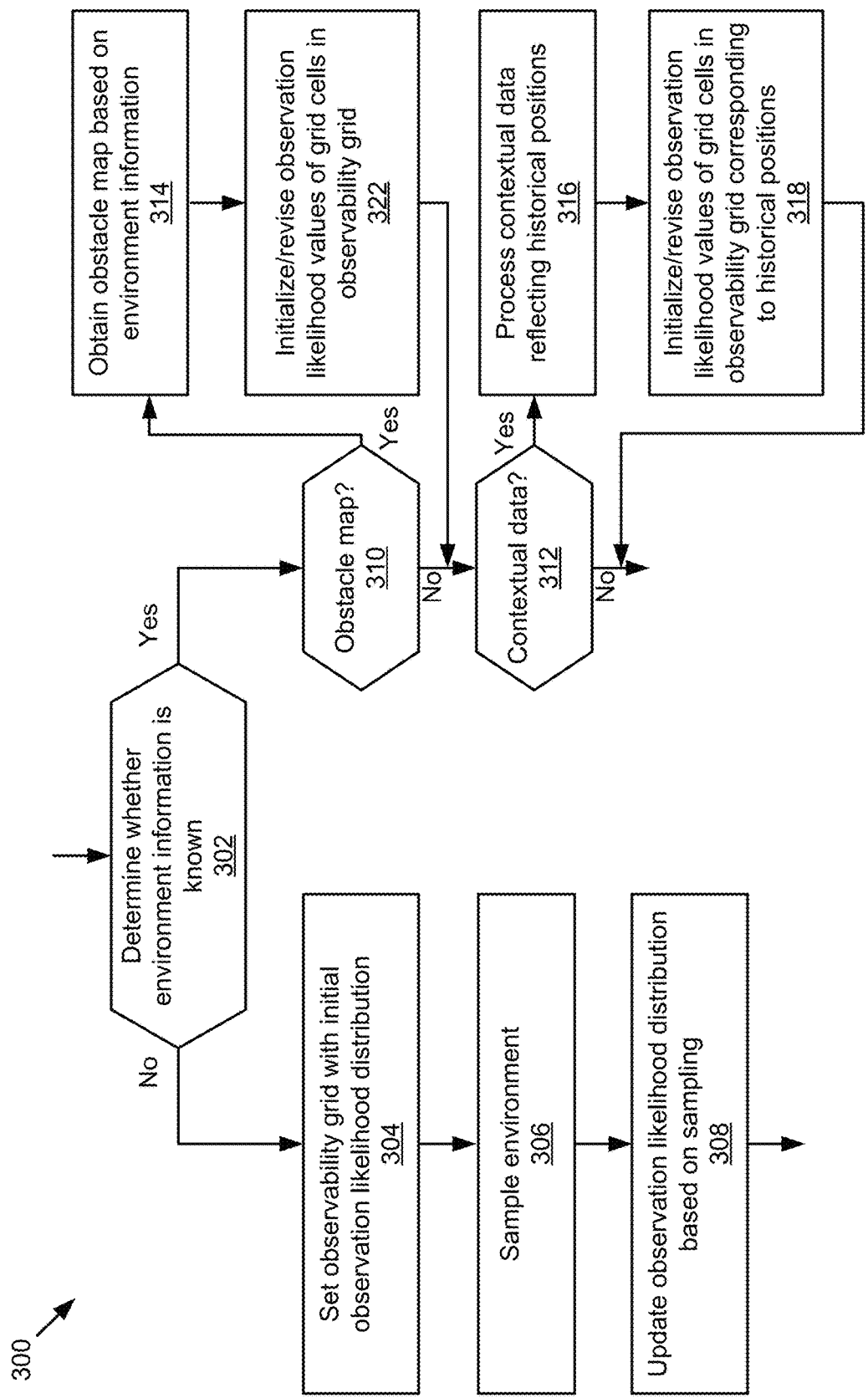
FIG. 3 is a flowchart of an example method for initializing an observability grid.
Figure 5:
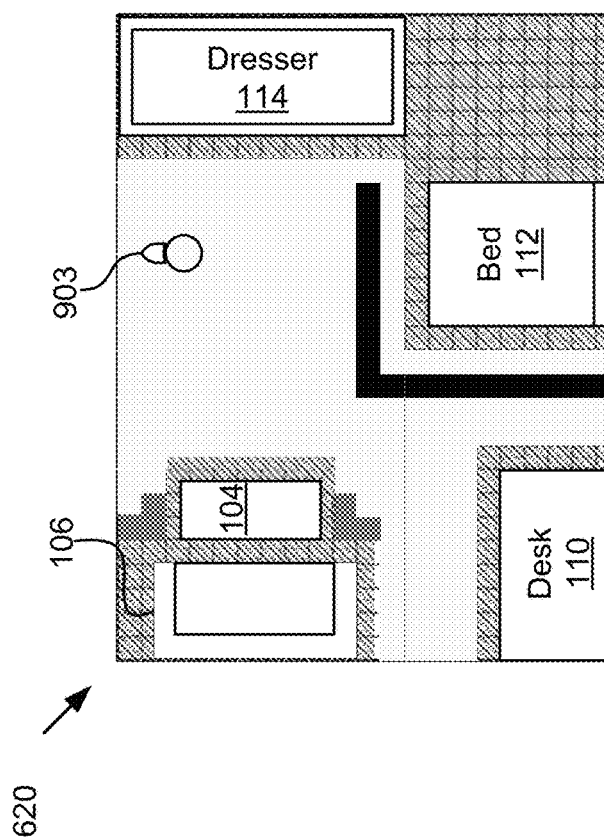
FIGS. 4-6B are diagrams of example observability grids.
Figure 4:
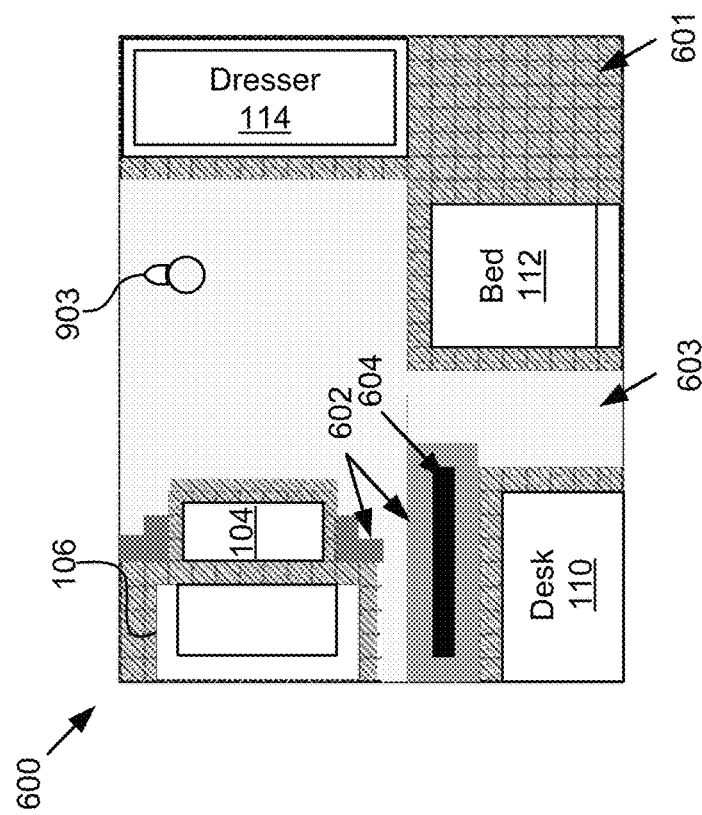
Figure 6B:
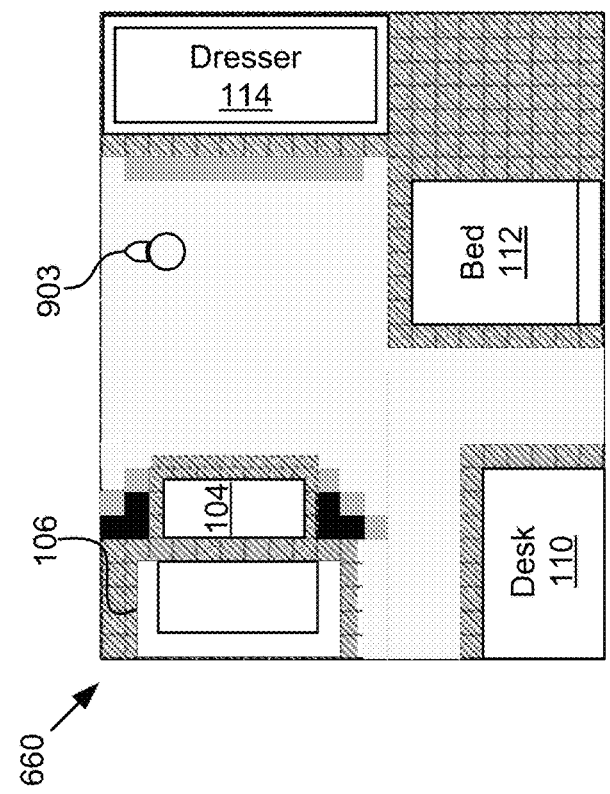
Figure 6A:
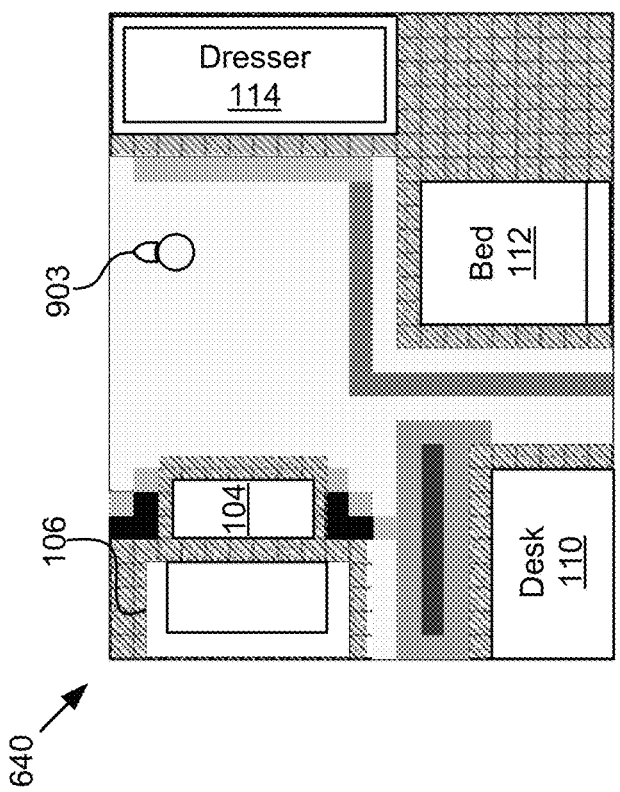

FIG. 3 is a flowchart of an example method 300 for initializing an observability grid. In some embodiments, one or more of the operations in the method 300 may be performed in association with block 202 of the method 200, although other method variations and operation sequences are also possible.

In block 302, the grid initializer 1002 may determine whether an environment information is known. If the determination in block 302 is negative, the grid initializer may set the observability grid with initial observation likelihood distribution. The grid initializer 1002 may then sample the environment with the detection system 903 based on the observation likelihood distribution of the observability grid. For instance, the grid initializer 1002 may signal the navigator 1010 to begin sampling the environment 306 so that the detection system 903 may familiarize itself with the environment by navigating to the environment using a path determined by the navigator 1010 and the object detector 1008 may take observations along the way to determine positions of obstacles and/or objects that are to be observed in the environment. In some embodiments, the sampling may be performed in conjunction with active searching and/or observation of objects within the environment. In further embodiments, the sampling may be performed as independently of searching the environment. As the detection system 903 navigates the environment and performs various observations at different observation points within the environment, the grid updater 1008 receives detection data reflecting an outcome from the object detector 1004 in association with a given observation point, processes the detection data to determine the outcome of the observation at the observation point, and updates a likelihood value associated with the grid cell corresponding to the observation point depending on the outcome.

For observations performed during sampling or along an informed search path/search, the grid updater 1008 may receive positional data from the navigator 1010 reflecting spatial coordinates associated with the observation point and may correlate the positional data with the detection data received from the object detector 1004 in order to determine which cell in the observability grid to update. The grid updater 1008 may determine the likelihood value based on the objects reflected in the detection data. For example, the object detector 1004 may extract features from the sensor data, perform object recognition on the features to attempt to determine their identity, determine confidence values for recognized objects, and provide outcome data reflecting the confidence values to the grid updater 1008, which may in-turn generate corresponding likelihood values based on the confidence values. The grid updater 1008 may then compare the generated likelihood value(s) with the existing likelihood value(s) associated with the grid cell of interest, and may update the existing likelihood value(s) with the generated likelihood values based on one or more update criteria. The update criteria may include a requisite number of times a similar likelihood value was generated from a similar position and orientation at the observation point, a minimum numerical distance between the existing likelihood value generated likelihood value, etc.

In some cases, the grid updater 1008 may update values of the observability grid positively or negatively based on the detected result. As a further example, an updated likelihood value may be an updated angle and/or location at which to capture sensor data describing the target object, although other variations are also possible and contemplated.

If the grid initializer 1002 determines that the environment is known, in block 310, the grid initializer 1002 may determine whether an obstacle map is available for the environment. For instance, the grid initializer 1002 may query the grid database 999, using the unique identifier for the environment, for obstacle map data stored in association with the unique identifier. If obstacle map data is available, the grid initializer 1002 may retrieve the obstacle map process in block 322 it to determine likelihood values for associated grid cells. For instance, the grid initializer 1002 may identify grid cells in the observability grid that correspond to locations that are obstructed, and reduce the observation likelihood values for the corresponding grid cells in the observability grid. Locations that are obstructed may be difficult to reach or unreachable by the mobile detection system 903, or may block the vision or other sensing functionality performed by the detection system 903. In another example, the grid initializer 1002 may identify grid cells that correspond to locations that are not obstructed and may increase likelihood values for those cells while reducing and/or maintaining initial values for grid cells that that correspond to locations that are obstructed. Other variations are also possible and contemplated.

Stated another way, the grid initializer 1002 may retrieve the obstacle map data and process it to determine the locations of obstacles within the environment, and generate corresponding likelihood values reflecting the existence of obstructions so that when the navigator 1010 generates a path, it can be informed as to the locations of those obstacles.

If obstacle map data is not available, or upon return of the operation in block 314, the grid initializer 1002 may determine if contextual data is available for the environment. For example, the grid initializer 1002 may query the grid database 999 for contextual data stored in association with the environment, such as contextual data indexed using unique identifier associated with the environment. If the contextual data is available, the grid initializer 1002 may retrieve the contextual data reflecting historical positions from which detection system(s) 903 observed objects and may, in block 318, generate likelihood values based on the contextual data. For instance, the grid initializer 1002 may processes the contextual data reflecting one or more historical position(s) of a target object within the environment, and may increase observation likelihood values of grid cells in the observability grid corresponding to the historical position(s). As a further example, the grid initializer 1002 may initialize/revise observation likelihood values of grid cells in the observability grid correspond to the historical positions and/or decrease the likelihood values of grid cells in the observability grid that do not correspond. This can advantageously limit the initial randomness of likelihood of values of the grid cells and more quickly enable a detection system 903 to identify reliable positions from which to observe target objects.

As described elsewhere herein, the contextual data processed by the grid initializer 1002 may in some cases reflect one or more of a historical position, co-occurrence of animate or inanimate objects, a time, a date, a light condition, and a weather condition. More than one of these factors may apply in some cases, and the grid initializer 1002 may union and/or intersect the likelihoods associated with these different factors to form combined likelihood values, or may weight each of these factors differently when producing the likelihood values depending on which factors may be the most influential at that moment.

In block 204, the navigator 101 searches the environment using the observability grid for an observation point. The grid includes likelihood values indicating the most likely locations (relative to likelihood values of other locations) in the environment from which to successfully observe the target. In some embodiments, the navigator 1010 determines an observation point based on grid cell value(s) reflecting the most likely position(s) and/or observation angle(s). In some embodiments, the navigator 1010 may translate the spatial coordinates associated with the grid cells and/or the angular data reflecting angular position to velocity values and instruct the propulsion system 957 of the detection system 903 to move the detection system 903 to that location and position the sensor(s) 955 of the detection system 903 based on the angular position.

In some embodiments, in searching the environment, the navigator 1010 may determine a path via which to navigate the environment. For instance, the navigator may determine the observation point(s) and a path traversing the observation point(s) based on observation likelihood value(s) associated with the observation point(s) and other factors, which may include but are not limited to one or more of a traversal speed, a distance to the observation point, and an angle of observation associated with the observation point. The navigator 1010 may then navigate the mobile detection system 903 to the observation point(s) using the path.

Depending on the familiarity with the environment, the paths determined by the navigator 1010 may vary in accuracy. For instance, in an environment that is new or has been changed, the grid initializer 1002 may initialize the grid for the environment using various different distributions. For example, as depicted in FIG. 7A, using a uniform distribution of likelihood values, the navigator 1010 may instruct the detection system 903 to navigate an environment using the path 704, which steps the detection system 903 iteratively back and forth through the environment since each grid cell has the same value initially. Using a random initial distribution, the navigator 1010 may instruct the detection system 903 to navigate the environment using the path 706, which guides the navigation system 903 along various points that have the highest initial likelihoods as determined by the random distribution. Using a predefined initial distribution, the navigator 1010 may instruct the detection system 903 to navigate the environment using a predetermined path 708 determined based on predetermined likelihoods included in the initial distribution. For instance, the highest initial likelihoods may form a path that guides detection system 903 along the periphery of the environment.

Regardless of the path, the detection system 903 may sense obstacles that are obstructing its path and/or perform observations along the way, and depending on the results of the observations, such as whether any objects were detected, whether any occlusions were detected, etc., may update the likelihood values of the grid cells a corresponding to the locations from which the sensor data was collected. Additionally or alternatively, the detection system 903 may store obstacle map data, reflecting the positions of obstacles, in a non-transitory data store, such as the grid database 999, as discussed elsewhere herein.

In some embodiments, the path may be dynamically updated based on real-time sensory input received via the sensor(s) 955 of the detection system 903. The path may include a plurality of observation point(s), and may order navigation to the observation point(s) based on one or more ranking criteria, including but not limited to, distance to the observation point, likelihood value of the observation point, etc.

Figure 7B:
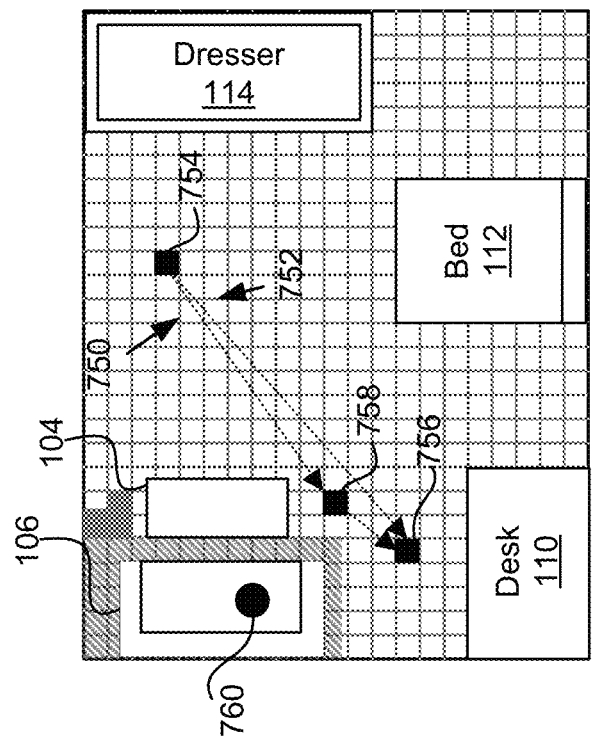
FIG. 7B is a diagram illustrating two different observation paths.
Figure 7A:
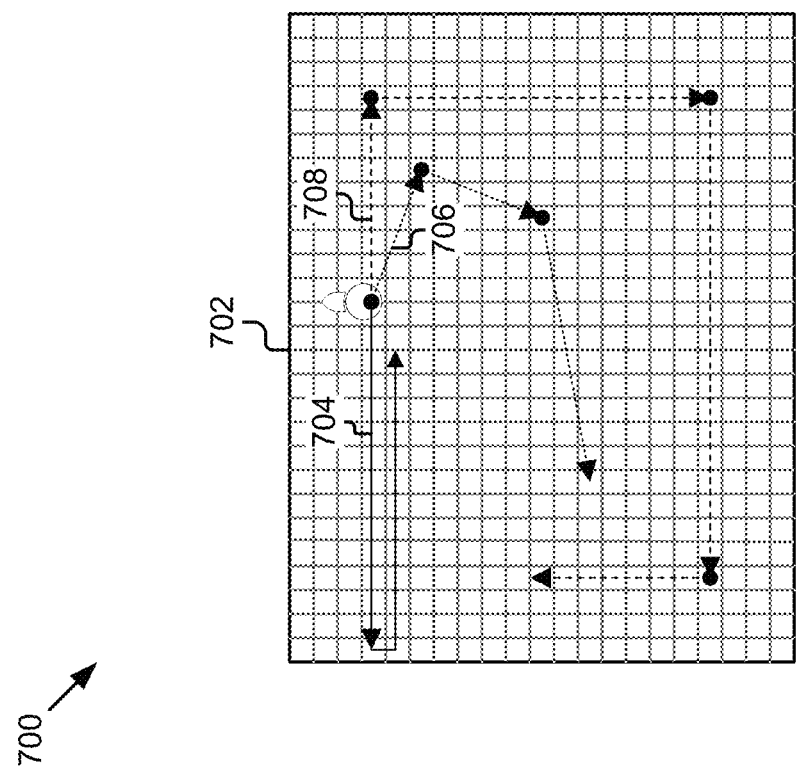
FIG. 7A is a diagram illustrating example sampling observation paths.

For instance, as shown in FIG. 7B, which illustrates two different possible observation paths 750 and 752 through an environment, such as a room including various items like a couch 106, a coffee table 104, a desk 110, a bed 112, a dresser 114, etc. The path 750 includes two observation points 758 and 756, while the path 752 includes a single observation point 756. The target object 760 is most likely to be observed successfully from observation point 756 (a region between the couch 106 and the desk 110) in the room. However, the region near the coffee table (reflected by observation point 758), although less likely than observation point 756, is also highly likely relative to other locations and closer to the starting position of the robot (point 754). By taking a longer path 750 and traversing to observation point 758 first, the robot can visit multiple observation points faster than if it just moved directly to the highest-valued position (observation point 756). In contrast, if time is weighted more highly than coverage, the navigator 1010 may determine to use path 752 and navigate directly to the point with the highest likelihood value (point 756).

It should be understood that the above examples are non-limiting and that numerous further variations are also possible and contemplated.

In block 206, the navigator 1010 navigates, using a propulsion system 957, the detection system 903 to the observation point. In some embodiments, the navigator 1010 may navigate to the observation point(s) using a path, and may augment that path based on sensor data collected by the sensor(s) 955 and/or other input (user feedback, server requests, likelihood value updates, etc.). The data describing the path may include spatial coordinates of each of the observation points and observation angles for positioning the sensor(s) 955, and the navigator 1010 may translate the spatial coordinates into control signals for controlling the propulsion system 975 of the detection system 903, which in turn, maneuvers the detection system 903 along the path to each observation point and/or orients the detection system 903 at the observation point, using motorized wheels, tracks, and/or other mechanisms.

In block 208, the object detector 1004, observes, using one or more sensors 955 of the detection system 903, target object(s) from the observation point. By way of further example, the object detector 1004 may perform a single or multiple observations at the observation point, may perform an observation at one or more of a location before the observation point, at the observation point, and a location past the observation point, etc.

In block 210, the object detector 1004 determines whether the result of an observation is satisfactory. If not, the object detector optionally adjusts local observability and/or updates the observability grid in blocks 212 and 214, respectively.

For instance, upon making an observation, the object detector 1004 may determine whether one or more target objects were detected, and based thereon, may signal the grid updater 1008 to update the observability grid positively or negatively.

In some embodiments, the object detector 1004 may observe the environment for a change in one or more of a camera pose and an observed scene and may trigger an adaptation to the change if detected. In further embodiments, the object detector 1004 may continually or iteratively trigger updates to the likelihood values for the corresponding grid cell(s) of the grid by the grid updater 1008 based on the sensor data being captured (e.g., images being captured by one or more cameras, etc.).

In some embodiments, in block 212, object detector 1004 may determine to adjust a local observability based on a type of the target object and a perceptual recognition performed by the mobile detection system 903. For instance, the object detector 1004 of the detection system 903 may execute an observation and determine that the object under observation has been detected, and responsive to doing so, may obstruct the grid updates 1008 to update in block 214 the observability grid based on the observation detecting the object. For example, the grid cell may reflect a certain likelihood value indicating that the location corresponding to the grid cell is an optimal place for observing a particular person. However, the captured image data may reflect that the person has shifted his or her position and that only a partial image of the user has been captured. The object detector 1004 may signal the grid updater 1008 of the change and the grid update 1008 may update the angle for that grid cell to reposition the sensor(s) to capture a scene including the person of interest.

There are a variety of situations for which local observability may be increased. In some cases, the determination to increase local observability may depend on the target being searched for and/or the perceptual recognition system (e.g. sensor or combination of sensor(s) 955 being used by the detection system 903. For instance, the detection system 903 may detect a person at a given location, but cannot identify them uniquely from its current position. In that case, the object detector 1004 may seek a new observation position in the vicinity of the target object. The new observation point may be at a closer distance, a different angle, a combination of the foregoing, etc. In a further example, because the sensor(s) in some cases may not be able to expand their field of view or range, the sensor(s) 955 may be unable to capture data reflecting the target object if co-located with the target object or situated too closely to the target object (e.g., may detect partial, obfuscated, or out-of-focus data, etc., that is insufficient to identify the target object). In such a case, the object detector 1004 may increase the observability around and pointed at the detected person.

In a more particular example, if a target object is detected at location, $\{d_x, d_y\}$, then for grid cell with centroid $\{g_x, g_y, \theta\}$:

$$\vec{d} = \left\{ d_x, d_y, \tan^{-1}\left(\frac{d_y - g_y}{d_x - g_x}\right) \right\} \quad \text{Equation 4}$$

$$P_{pos}(\vec{d}, \vec{g}) = e^{-(\vec{g}-\vec{d})\sum_{pos,outer}^{-1}(\vec{g}-\vec{d})^T} - e^{-(\vec{g}-\vec{d})\sum_{pos,inner}^{-1}(\vec{g}-\vec{d})^T} \quad \text{Equation 5}$$

$$L_{pos}(\vec{d}, \vec{g}) = \begin{cases} P_{pos}(\vec{d}, \vec{g}) & \text{if } P_{pos}(\vec{d}, \vec{g}) > 0.5 \\ 0.5 & \text{else} \end{cases} \quad \text{Equation 6}$$

where $\Sigma_{pos,outer}$ is the covariance matrix of the larger region, and $\Sigma_{pos,inner}$ is the covariance matrix describing the inner, lower probability area where the sensor(s) 955 should not be placed. Assuming circular Gaussians, where the variance in x is the same as the variance in y ($\sigma_x = \sigma_y$), then the variance describing the outer Gaussian should be greater than the variance of the inner Gaussian (i.e. $G_{pos,outer} > G_{pos,inner}$). Then the observability grid is updated as follows:

$$O_{new}(\vec{g}) = O_{old}(\vec{g}) + \log\left(\frac{L_{pos}(\vec{d}, \vec{g})}{1 - L_{pos}(\vec{d}, \vec{g})}\right) \quad \text{Equation 7}$$

In the above example, if all observation angles are summed, then this update may create a doughnut shaped region of high likelihood, as reflected in graph 800 depicted in FIG. 8A, which shows the doughnut shape 806, rotated slightly and colored (outer grey region 804 bordering shape=low likelihood, dark region 808=high likelihood) to observe the effects of proximity to the detected person, which may be at the center 810 of the shape 808.

In some instances, regions containing obstacles may be filtered out in the update process since the robot cannot move into them (and/or likelihood values reflecting their presence have already been assigned). A shape generated by the object detector 1004 is shown in the graph 820 depicted FIG. 8B, where the white lines/cells 824 indicate obstacles. In seeking the next highest likelihood position, the navigator 1010 may navigate the detection system 903 automatically to the dark area 828 area around the target in an attempt to observe the target object from different angles before moving to another part of the room.

The above-described examples may attempt to find non-unique objects before trying to uniquely identify a specific object (e.g. a particular person). Further variations may include:

Detecting related objects to the target. If looking for a person, this could include detecting the target's clothing nearby (e.g. hat or jacket), other accessories or items representative of the object, etc., finding people who are commonly with the target object (e.g., friends or close co-workers). In an example of an inanimate target object, the object detector 1004 could detect associated counterpart objects (e.g., if finding objects like dinner plates, the object detector 1004 could find silverware, food, etc.). In any case, the object detector 1004 could increase nearby likelihood around the detection, but possibly in some cases without the inner region of lower likelihood.

Positive, but low recognition scores. Recognition systems used by the object detector 1004, such as face or object recognition, may return a confidence score indicating likelihood. If the score is high, but too low for a positive match, then the observability of grid cells that can see the target may be increased in a fashion similar to the person detection example above. This, in some cases, can depend on the failure points of the object detector 1004 and the covariance matrix may need to be updated to emphasize distance, angle, specific directions, etc.

Room likelihoods. Some objects or people may be highly associated with specific environments. For instance, when looking for a chef, the object detector 1004 may use place labeling algorithms to detect kitchen areas, and add positive evidence to the observability grid to force further investigation/detection.

If a case where nothing new is detected during an observation at an observation point by the object detector 1004, the object detector 1004 may, in some cases, decrease likelihood values in the observability grid in the grid cell or cell located under and/or in the direct vicinity of the sensor(s) 955. This is similar to the above-described positive update, except that the effect is negative. Given the current sensor position, c, and a grid cell centroid, g, the observability grid at g may be updated using Equation 8:

$$O_{new,neg}(\vec{c}, \vec{g}) = O_{old}(\vec{g}) - \log\left(\frac{L_{ctxt}(\vec{c}, \vec{g})}{1 - L_{ctxt}(\vec{c}, \vec{g},)}\right) \quad \text{Equation 8}$$

In this case, the same covariance matrix ($\Sigma_{db}$) as used for the contextual update may be used, because both are updated with respect to the current sensor position, although they are not required to be the same.

In some embodiments, the detection system 903 may request human feedback and add the results to the observability grid based thereon. In particular, pointing gestures captured by the sensor(s) 955 and processed by the object detector 1004, interpreted, and used to update likelihood values for corresponding grid cells of the observability grid. These values may reflect positive contextual knowledge from a known sensor position, such as the pose and angle of the arm/hand. The likelihood values may add a positive, conical region to the observability grid for those cells pointing in the correct direction.

Auditory sources, such as spoken or verbal input, can also be captured by the sensor(s) 955 and processed and interpreted by the object detector 1004, and used to update likelihood values to reflect directions in which to sense, the makeup and/or identity of rooms, and/or or specific environmental locations to investigate. The likelihood values may reflect increased for observing target subjects from the indicated direction, location, room, etc.

If the operations in block 212 are executed, the method 200 may then return to block 208 for a subsequent localized observation, and so forth. If the operations in block 214 are executed, the method may then return to block 204 to further search the environment, or may proceed to block 206 to a subsequent observation point. In further variations, the method 200 may terminate, wait, or continue to other methods. In some cases, at the conclusion of 208, 212, and/or 214, the method 200, and/or aspects thereof may iterate as the detection system 903 maneuvers around and/or between environment(s) to make further observations.

Figure 9:
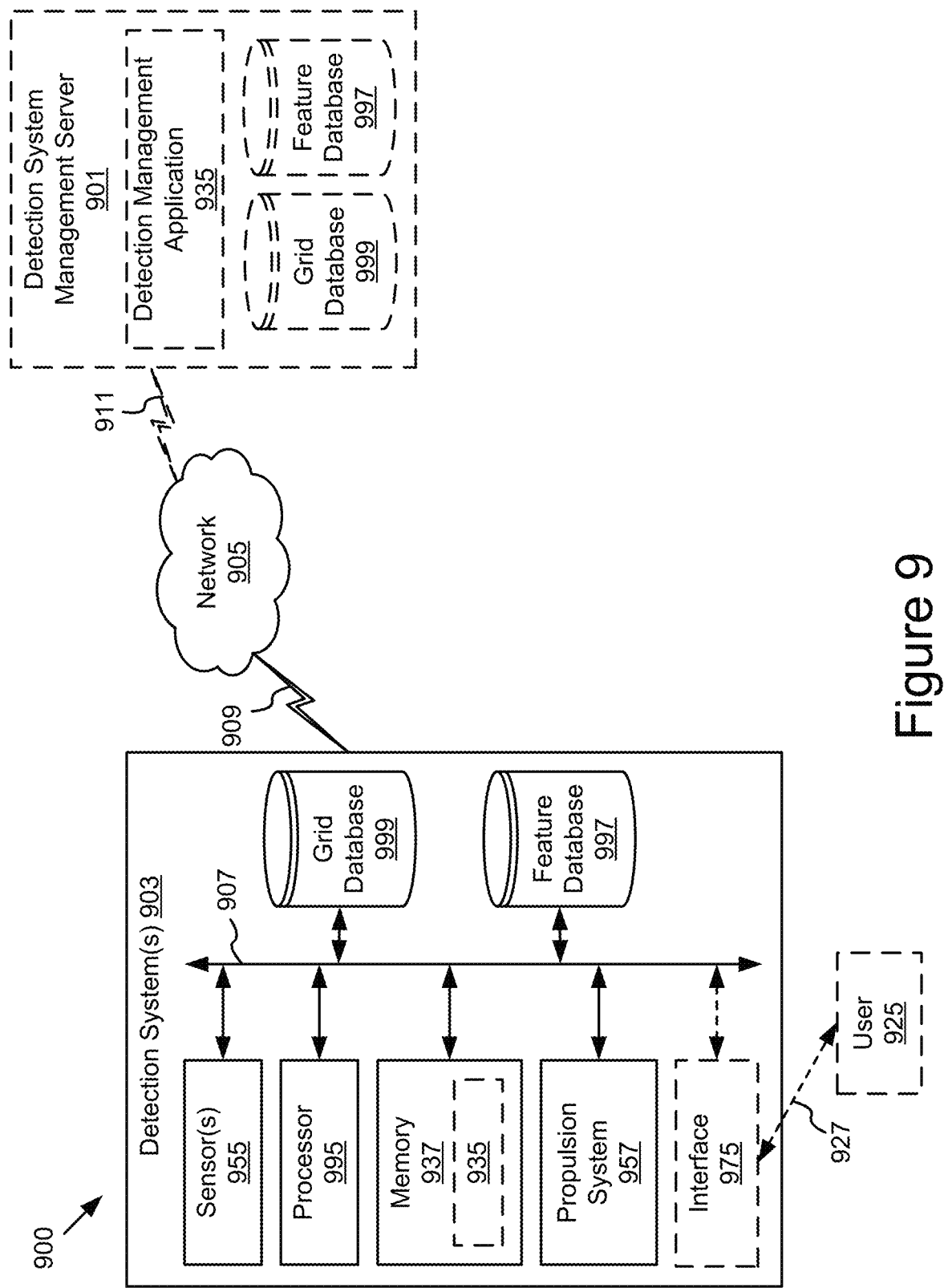
FIG. 9 is a block diagram of an example system.

FIG. 9 is a block diagram of an example system 900 for autonomous object detection. As illustrated, the system 900 may include a computation server 901 and/or a detection system 903 that may be accessed and/or interacted with by a user 925 (as depicted by line 927). Depending on the implementation, computation may be distributed across and/or dynamically shifted between two or more computing systems (e.g., the computation server 901 and the detection system 903, two or more detection systems 903), may be performed independently by the detection system 903, etc. As such, the system 900 may or may not include a computation server 901.

In embodiments where a computation server 901 is included, the detection system 903 and the computation server 901 may be communicatively coupled via a network 905 via signal lines 909 and 911, respectively. For example, the detection system 903 and the computation server 901 may be communicatively coupled to each other via the network 905 to exchange data, such as sensor data, feature data, detection data, etc. The signal lines 909 and 911 in FIG. 1 may be representative of one or more wired and/or wireless connections. As a further example, the detection system 903 may transmit sensor data to the computation server 901 for processing and the computation server 901 may process the data as described herein to detect and recognize objects and send data and/or results describing the recognized objects to the detection system 903 for use thereby during operation. In embodiments where a computation server 901 is not included, the detection system 903 may operate autonomously or in conjunction with other detection systems 903 (not visible) to detect and recognize objects, scenes, human locations, etc. For instance, a detection system 903 may be networked via a computer network with other similar detection systems 903 to perform the computations discussed herein.

While FIG. 9 depicts a single detection system 903 and computation server 901, it should be understood that a variety of different system environments and configurations are possible, contemplated, and within the scope of the present disclosure. For instance, some embodiments may include additional or fewer computing devices, services, and/or networks, and may implement various functionality locally or remotely on other computing devices. Further, various entities may be integrated into to a single computing device or system or distributed across additional computing devices or systems, etc. For example, the detection management application 935 may be stored in, executable by, and distributed across a combination of computing devices and/or systems or in one computing device and/or system.

The network 905 may include a standard type network, wired or wireless, and may have any number of configurations, such as a star configuration, token ring configuration, or other known configurations. The network 905 may include one or more local area networks ("LANs"), wide area networks ("WANs") (e.g., the Internet), virtual private networks ("VPNs"), peer-to-peer networks, near-field networks (e.g., Bluetooth™), cellular networks (e.g., 3G, 4G, other generations), and/or any other interconnected data path across which multiple computing nodes may communicate. Data may be transmitted in encrypted or unencrypted form between the nodes of the network 905 using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOW), file transfer protocol (FTP), WebSocket (WS), wireless access protocol (WAP), various messaging protocols (SMS, MMS, XMS, IMAP, SMTP, POP, WebDAV, etc.), or other known protocols.

The detection system 903 may be representative of or included in an autonomous computing system capable of perceiving, recognizing, and interpreting the significance of objects within its environment to perform an action. For example, the detection system 903 may be representative of or incorporated into an intelligent car having the capability of recognizing a particular driver or passenger inside the car. In further examples, the detection system 903 may be representative of or incorporated into a social robot that can cooperate with humans and/or other robots to perform various tasks, or an autonomous system operating in populated environments. In some embodiments, the detection system 903 may be incorporated in other systems as a component for detecting and recognizing objects. For instance, the detection system 903 may be incorporated into a client device such as a gaming system, television, mobile phone, tablet, laptop, workstation, server, etc. For example, the detection system 903 may be embedded in a machine or computer system for determining if a certain person or persons are present at a particular location and the machine or computer system can turn on/off or execute a particular program if that certain person or persons are present at the particular location.

In some embodiments, the detection system 903 may include one or more sensor(s) 955, a processor 995 (which may represent one or more processors), a memory 937 (which represents one or more non-transitory memory devices), a feature database 997, a grid database 999, and/or an interface 975. As depicted, the sensor(s) 955, the processor 995, the memory 937, the propulsion system 957, the interface 975, the grid database 999, and the feature database 997 are electronically communicatively coupled via a communications bus 907. In some embodiments, an instance of the detection management application 935, or various components thereof, can be stored on and executable by the computation server 901, as described elsewhere herein. The instances of the detection management application 935 are also referred to herein individually and/or collectively as the detection management application 935.

Although each of the processor 995, sensor(s) 955, memory 937, propulsion system 957, interface 975, grid database 999, feature database 997, etc., may be depicted and/or referred to herein in the singular or plural, it should be recognized that the detection system 903 can include any suitable number of these components. Furthermore, it should be appreciated that, depending on the configuration, the detection system 903 may include suitable elements explicitly not shown in FIG. 1, such as an operating system, programs, various additional sensors, motors, movement assemblies, input/output devices like a speaker, a display device, a transceiver unit and an antenna for wireless communication with other with other devices (e.g., the computation server 901, other detection systems 903 (not shown), any other appropriate systems (not shown) communicatively coupled to the network 905, etc.

The sensor(s) 955 may include one or more sensors configured to capture light and other signals from the surrounding environment and to generate and/or processes sensor data, such as depth data, therefrom. For instance the sensor(s) 955 may include a range camera, such as but not limited to an RGB-D camera, a stereo camera, a structured light camera/scanner, time-of-flight camera, interferometer, modulation imager, a laser rangefinder, a light-field camera, an intensified CCD camera, etc., although it should be understood that other types of sensors may be used, such as but not limited to an ultrasound sensor, a color camera, an infrared camera, etc. In some embodiments, the sensor(s) 955 and/or detection system 903 may include a combination of different types of sensors, such as accelerometers, gyroscopes, thermometers, barometers, thermocouples, microphones, or other conventional sensing devices. The sensor(s) 955 may be incorporated into the processor 995 or may be a disparate device that includes a separate controller that is coupled to the processor via a wireless or wired connection. Other variations are also possible and contemplated.

The processor 995 may include any processor-based computing device. The processor 995 may receive sensor data from the sensor(s) 955, process the sensor data, generate and/or provide results for presentation via the interface 975 based on the processing, trigger various programs based on the processing, control the behavior and/or movement of the detection system 903 or associated systems based on the processing, cooperate with the computation server 901 to process the sensor data, etc., as described elsewhere herein. In some embodiments, the processor 995 may store the processed sensor data and/or any results processed therefrom in the feature database 997.

The processor 995 may execute software instructions by performing various input/output, logical, and/or mathematical operations. The processor 995 may have various standard or customized computing architectures to process data signals. The processor 995 may be physical and/or virtual, and may include a single core or plurality of processing units and/or cores. In some implementations, the processor 995 may be capable of generating and providing electronic display signals to a display device (not shown), supporting the display of images, capturing and transmitting images, performing complex tasks including various types of feature extraction and sampling, etc. In some implementations, the processor 995 may be coupled to the memory 937 via the bus 907 to access data and instructions therefrom and store data therein. The bus 907 may couple the processor 995 to the other components of the detection system 903. The processor 995 and the detection management application 935 are described in detail elsewhere herein.

The memory 937 may store and provide access to data to the other components of the computing system (e.g., the detection system 903, the detection system management server 901, etc.). In some implementations, the memory 937 may store instructions and/or data that may be executed by the processor 995. For instance, the memory 937 may store the detection management application 935 and/or components thereof. The memory 937 is also capable of storing other instructions and data, including, for example, an operating system, hardware drivers, firmware, other software applications, databases, etc. The memory 937 may be coupled to the bus 220 for communication with the processor 995 and the other components of the computing device 200.

The memory 937 includes one or more non-transitory computer-usable (e.g., readable, writeable, etc.) media, which can include an apparatus or device that can contain, store, communicate, propagate or transport instructions, data, computer programs, software, code, routines, etc., for processing by or in connection with the processor 995. In some implementations, the memory 937 may include one or more of volatile memory and non-volatile memory. For example, the memory 937 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-Ray™, etc.). It should be understood that the memory 937 may be a single device or may include multiple types of devices and configurations.

The interface 975 provides for communication with other computing entities of the system 900 and/or users of the system 900. The interface 975 may include any number of input and output devices. In some instances, the interface 975 includes one or more wired interfaces and/or wireless transceivers for sending and receiving data. The interface 975 may couple to the network 905 and communicate wiredly or wirelessly with other computing nodes, such as the detection system 903 and/or the computation server 901 (depending on the configuration). The interface 975 may exchange data with other computing nodes using standard communication methods, such as those discussed above regarding the network 905.

The interface may include hardware to handle communications between the user 925 and the processor 995. For example, the interface 975 may include one or more of a screen for displaying detection information to the user 925; a speaker for outputting sound information to the user 925; a microphone for capturing sound and/or voice commands; indicators (e.g., LEDs), and any other input/output components facilitating the communications with the user 925. In some embodiments, the interface 975 is configured to transmit an output from the processor 995 to the user 925. For example, the interface 975 includes an audio system for playing a voice greeting to the user 925 responsive to the processor 995 detecting that the user 925 is within the vicinity. It should be understood that the interface 975 may include other types of devices for providing the functionality described herein.

The user 925 may be a human user. In one embodiment, the user 925 is driver or a passenger sitting in a vehicle on a road. In another embodiment, the user 925 is a human located within a premises that interacts with a robot. In a further embodiment, the user is a conventional user of a computing device. The user 925 may interact with, or otherwise provide inputs to and/or receives outputs from, the interface 975 which sends and receives different types of data to and from the processor 995.

The grid database 999 and/or feature database 997 is stored in a non-transitory storage medium/media, such as one or more a static random access memory (SRAM) devices, flash memories, hard disk drives, disk-based memory devices, or some other known volatile or non-volatile physical storage device. In some instances, the grid database 999 and/or feature database 997 may store data in the memory 937. In some instances, the grid database 999 and/or feature database 997 may be included in the detection system 903 or in another computing device and/or storage system distinct from but coupled to or accessible by the detection system 903. In some instances, the databases 997 and 999 may store data in association with a database management system (DBMS) operable by the detection system 903 and/or the computation server 901. For example, the DBMS could include a structured query language (SQL) DBMS, a NoSQL DMBS, flat file system, conventional file system, etc. In some instances, the DBMS may store data in multi-dimensional tables comprised of rows and columns, and manipulate, i.e., insert, query, update and/or delete, rows of data using programmatic operations. Further aspects of the feature databases 997 and 999 are discussed below.

The computation server 901 is one or more computing devices having a processor (e.g., a processor 995) (not pictured) and a non-transitory computer-readable storage medium (e.g., a memory 937) (not pictured) to facilitate the detection system 903 to detect and recognize objects. In some embodiments, the computation server 901 includes an instance of the detection management application 935. In network-based embodiments, the computation server 901 may receive sensor data, detection data, grid data, location data, and/or any other data discussed herein, from the detection system 903 and/or other relevant information sources, process the data, and send results of processing to the requesting entity (e.g., detection system 903).

The detection management application 935 may be coupled to the sensor(s) 955 to receive sensor data. In some embodiments, the sensor data received from the sensor(s) 955 may include image data describing an image of an environment. The image may be an image depicting a scene including one or more objects. An object may be a living or a non-living object, an animate or inanimate object, etc. Example objects include but are not limited humans, animals, furniture, fixtures, cars, utensils, etc.

Figure 10:
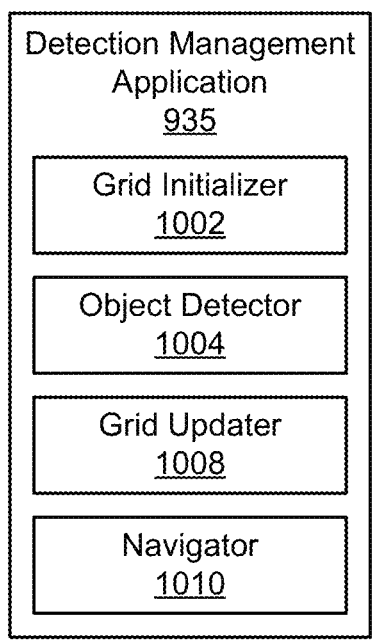
FIG. 10 is a block diagram of an example observability grid generator.

FIG. 10 is a block diagram of an example detection management application 935, which may include a grid initializer 1002, an object detector 1004, a grid updater 1008, and a navigator 1010, although it should be understood that the detection module 136 may include additional components and/or that various components may be combined into a single module or divided into additional modules.

The grid initializer 1002, object detector 1004, grid updater 1008, and/or navigator 1010 may be implemented as software, hardware, or a combination of the foregoing. In some implementations, the grid initializer 1002, object detector 1004, grid updater 1008, and/or navigator 1010 may be communicatively coupled by the bus 220 and/or the processor 995 to one another and/or the other components of the computing device. In some implementations, one or more of grid initializer 1002, object detector 1004, grid updater 1008, and/or navigator 1010 are sets of instructions executable by the processor 995 to provide their functionality. In further implementations, one or more of the grid initializer 1002, object detector 1004, grid updater 1008, and/or navigator 1010 are stored in the memory 937 and are accessible and executable by the processor 995 to provide their functionality. In any of the foregoing implementations, the grid initializer 1002, object detector 1004, grid updater 1008, and/or navigator 1010 may be adapted for cooperation and communication with the processor 995 and other components of the computing device (e.g., the detection system 903, the server 901, etc.).

Further structure, acts, and/or functionality of the grid initializer 1002, object detector 1004, grid updater 1008, and/or navigator 1010 are discussed in detail elsewhere herein.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method for observing a target object with a robot using an observability grid, the method comprising:
   initializing, using one or more processors, the observability grid with an observation likelihood distribution for an environment being navigated by the robot;
   searching, using the one or more processors, the environment using the observability grid for a first observation point, the first observation point corresponding to a grid cell of the observability grid and being a physical location from which the target object is observable, the observability grid including a plurality of grid cells associated with a plurality of observation likelihood values;
   navigating, using a propulsion system, the robot to the first observation point corresponding to the grid cell that has a higher observation likelihood value than other observation points corresponding to other grid cells in the observability grid;
   observing, using one or more sensors of the robot, the target object from the first observation point;
   updating, using the one or more processors, the observability grid based on observing the target object from the first observation point;
   navigating, using the propulsion system, the robot to a second observation point;
   observing, using one or more sensors of the robot, the target object from the second observation point; and
   updating, using the one or more processors, the observability grid based on observing the target object from the second observation point.

2. A computer-implemented method comprising:
   initializing, using one or more processors, an observability grid with an observation likelihood distribution for an environment being navigated by a mobile detection system;
   searching, using the one or more processors, the environment using the observability grid for an observation point, the observation point corresponding to a grid cell of the observability grid and being a physical location from which a target object is observable, the observability grid including a plurality of grid cells associated with a plurality of observation likelihood values;
   navigating, using a propulsion system, the mobile detection system to the observation point corresponding to the grid cell that has a higher observation likelihood value than other observation points corresponding to other grid cells in the observability grid; and
   observing, using one or more sensors of the mobile detection system, the target object from the observation point.

3. The method of claim 2, wherein the observability grid includes two or more spatial dimensions and an angular dimension.

4. The method of claim 2, further comprising:
   determining, using the one or more processors, to adjust a local observability based on a type of the target object and a perceptual recognition performed by the mobile detection system.

5. The method of claim 2, wherein initializing the observability grid further comprises:
   sampling, using the one or more sensors, the environment with the mobile detection system based on the observation likelihood distribution of the observability grid.

6. The method of claim 2, wherein initializing the observability grid further comprises:
   retrieving, using the one or more processors, an obstacle map;
   identifying, using the obstacle map, grid cells in the observability grid that correspond to locations that are obstructed; and
   reducing, using the one or more processors, observation likelihood values for corresponding grid cells in the observability grid.

7. The method of claim 6, wherein the locations that are obstructed are unreachable by the mobile detection system.

8. The method of claim 2, wherein the observation likelihood distribution includes one of a uniform distribution, a random initial distribution, and a predefined initial distribution.

9. The method of claim 2, wherein initializing the observability grid includes:
   processing contextual data reflecting one or more historical positions of the target object within the environment; and
   increasing observation likelihood values of grid cells in the observability grid corresponding to the one or more historical positions.

10. The method of claim 2, wherein initializing the observability grid includes:
    processing contextual data reflecting one or more of a historical position, co-occurrence of animate or inanimate objects, a time, a date, a light condition, and a weather condition.

11. The method of claim 2, further comprising:
    responsive to observing the target object from the observation point, updating, using the one or more processors, the observability grid to reflect a result of the observation.

12. The method of claim 11, wherein the observability grid is updated positively or negatively based on the result.

13. The method of claim 2, further comprising:
    determining the observation point and a path to the observation point based on an observation likelihood value associated with the observation point and one or more of a traversal speed, a distance to the observation point, and an angle of observation associated with the observation point, wherein navigating the mobile detection system to the observation point is performed using the path.

14. The method of claim 2, wherein observing the target object from the observation point includes one of:
    performing a single observation at the observation point;
    performing an observation at one or more of a location before the observation point, at the observation point, and a location past the observation point; and
    observing the environment for a change in one or more of a camera pose and an observed scene.

15. The method of claim 2, wherein observing the target object from the observation point further comprises:
   executing, using the one or more sensors, an observation by the mobile detection system;
   determining, using the one or more processors, that the observation has detected the target object; and
   updating, using the one or more processors, the observability grid based on the observation detecting the target object.

16. A system comprising:
a mobile detection system coupled to one or more sensors adapted to observe an environment, the mobile detection system including a propulsion system that moves the mobile detection system around the environment, the mobile detection system including one or more computer processors programmed to perform operations comprising:
   initializing an observability grid with an observation likelihood distribution for the environment being navigated by the mobile detection system;
   searching the environment using the observability grid for an observation point, the observation point corresponding to a grid cell of the observability grid and being a physical location from which a target object is observable, the observability grid including a plurality of grid cells associated with a plurality of observation likelihood values;
   navigating, using the propulsion system, the mobile detection system to the observation point corresponding to the grid cell that has a higher observation likelihood value than other observation points corresponding to other grid cells in the observability grid; and
   observing, using one or more sensors of the mobile detection system, the target object from the observation point.

17. The system of claim 16, wherein the observability grid includes two or more spatial dimensions and an angular dimension.

18. The system of claim 16, wherein the one or more computer processors are further programmed to perform operations comprising:
   determining to adjust a local observability based on a type of the target object and a perceptual recognition performed by the mobile detection system.

19. The system of claim 16, wherein initializing the observability grid further comprises:
   sampling, using the one or more sensors, the environment with the mobile detection system based on the observation likelihood distribution of the observability grid.

20. The system of claim 16, wherein initializing the observability grid further comprises:
   retrieving an obstacle map;
   identifying, using the obstacle map, grid cells in the observability grid that correspond to locations that are obstructed; and
   reducing observation likelihood values for the corresponding grid cells in the observability grid.

21. The system of claim 20, wherein the locations that are obstructed are unreachable by the mobile detection system.

22. The system of claim 16, wherein the observation likelihood distribution includes one of a uniform distribution, a random initial distribution, and a predefined initial distribution.

23. The system of claim 16, wherein initializing the observability grid includes:
   processing contextual data reflecting one or more historical positions of the target object within the environment; and
   increasing observation likelihood values of grid cells in the observability grid corresponding to the one or more historical positions.

24. The system of claim 16, wherein initializing the observability grid includes:
   processing contextual data reflecting one or more of a historical position, co-occurrence of animate or inanimate objects, a time, a date, a light condition, and a weather condition.

25. The system of claim 16, wherein the one or more computer processors are further programmed to perform operations comprising:
   responsive to observing the target object from the observation point, updating the observability grid to reflect a result of the observation.

26. The system of claim 25, wherein the observability grid is updated positively or negatively based on the result.

27. The system of claim 16, wherein the one or more computer processors are further programmed to perform operations comprising:
   determining the observation point and a path to the observation point based on an observation likelihood value associated with the observation point and one or more of a traversal speed, a distance to the observation point, and an angle of observation associated with the observation point, wherein navigating the mobile detection system to the observation point is performed using the path.

28. The system of claim 16, wherein observing the target object from the observation point includes one of:
   performing a single observation at the observation point;
   performing an observation at one or more of a location before the observation point, at the observation point, and a location past the observation point; and
   observing the environment for a change in one or more of a camera pose and an observed scene.

29. The system of claim 16, wherein observing the target object from the observation point further comprises:
   executing, using the one or more sensors, an observation by the mobile detection system;
   determining that the observation has detected the target object; and
   updating the observability grid based on the observation detecting the target object.

* * * * *